US009551483B1

(12) United States Patent
Mostoller et al.

(10) Patent No.: US 9,551,483 B1

(45) Date of Patent: Jan. 24, 2017

(54) MULTIPLE CABLE DISCONNECT

(71) Applicant: Tyco Electronics Corporation, Berwyn, PA (US)

(72) Inventors: Matthew Edward Mostoller, Hummelstown, PA (US); Christopher George Daily, Harrisburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 14 days.

(21) Appl. No.: 14/789,582

(22) Filed: Jul. 1, 2015

(51) Int. Cl.

| | |
|---|---|
| ***B60Q 1/26*** | (2006.01) |
| ***F21V 23/06*** | (2006.01) |
| ***H01R 24/20*** | (2011.01) |
| ***H01R 24/28*** | (2011.01) |
| ***H01R 13/05*** | (2006.01) |
| ***F21V 23/00*** | (2015.01) |
| *H01R 105/00* | (2006.01) |
| *F21Y 101/02* | (2006.01) |

(52) U.S. Cl.

CPC ............ *F21V 23/06* (2013.01); *F21V 23/001* (2013.01); *F21V 23/003* (2013.01); *H01R 13/05* (2013.01); *H01R 24/20* (2013.01); *H01R 24/28* (2013.01); *F21Y 2101/02* (2013.01); *H01R 2105/00* (2013.01)

(58) Field of Classification Search

CPC ................................ F21V 23/06; H01R 24/20

USPC .......................................... 362/227; 439/626

See application file for complete search history.

(56) References Cited

U.S. PATENT DOCUMENTS

| | | | |
|---|---|---|---|
| 4,963,102 | A | 10/1990 | Gettig et al. |
| 2006/0286864 | A1 | 12/2006 | Bethurum et al. |

FOREIGN PATENT DOCUMENTS

| | | | |
|---|---|---|---|
| EP | 2 058 904 A2 | 5/2009 | |
| GB | 2 294 817 A | 5/1996 | |
| WO | 86/03894 A1 | 7/1986 | |

OTHER PUBLICATIONS

International Search Report, International Application No. PCT/US2016/038461, International Filing Date Jun. 21, 2016.

*Primary Examiner* — Vip Patel

(57) ABSTRACT

A multiple cable disconnect includes a housing having a separable mating end and a wire terminating end configured to receive wires of power cables. The housing has a plurality of terminal chambers with terminals therein. The terminals each have a base, a mating contact extending from the base and a wire contact extending from the base. The mating contact has a mating pad defining a separable mating interface for the terminal for mating with a corresponding mating terminal of the mating connector. The wire contact has plural wire interfaces for mating with plural wires such that plural wires are configured to be terminated to and commoned with each terminal. Wire retention springs are received in the housing each having at least one spring arm defining a wire trap with the corresponding wire contact. The spring arms are releasable to release the wires from the housing.

20 Claims, 6 Drawing Sheets

MULTIPLE CABLE DISCONNECT

BACKGROUND OF THE INVENTION

The subject matter herein relates generally to multiple cable disconnects.

Electrical systems, such as lighting systems, use power cables to interconnect various electrical components of the system, such as to connect a power supply to an LED driver. Some systems require powering of multiple components, such as multiple LED drivers. For example, in a street light fixture, multiple LED arrays are provided to supply the required lighting. Each LED array is controlled by a corresponding LED driver. Each LED driver needs to be separately connected to the power supply. Typically, the line input from the power supply is split from the 3 wire cable and branched out to each of the LED drivers using a wire splice component such as a wire nut. When connecting multiple branch cables to the line input cable using the wire nut, difficulties arise. For example, one or more of the wires may be improperly terminated, leading to failure of the LED driver associated with such wire. Termination using the wire nut may be time consuming and bulky. Additionally, when one of the LED drivers fails and needs to be replaced, it is not possible to simply remove the one LED driver and associated cable. Rather, all of the wires are uncoupled from the wire nut.

A need remains for a multiple cable disconnect solution that allows wires of multiple power cables to be commoned and that allows the wires to be releasable therefrom for rework.

BRIEF DESCRIPTION OF THE INVENTION

In one embodiment, a multiple cable disconnect is provided including a housing having a separable mating end for mating with a mating connector and a wire terminating end configured to receive wires of power cables. The housing has a plurality of terminal chambers. Terminals are received in corresponding terminal chambers. The terminals each have a base, a mating contact extending from the base and a wire contact extending from the base. The mating contact has a mating pad defining a separable mating interface for the terminal for mating with a corresponding mating terminal of the mating connector. The wire contact has plural wire interfaces for mating with plural wires such that plural wires are configured to be terminated to and commoned with each terminal. Wire retention springs are received in the housing each having at least one spring arm defining a wire trap with the corresponding wire contact. The spring arms are releasable to release the wires from the housing.

In another embodiment, a cable connector assembly is provided having first and second multiple cable disconnects electrically connected together. The first and second multiple cable disconnects are identical and hermaphroditic and are inverted 180° relative to each other when coupled together. Each of the first and second multiple cable disconnects include a housing having a separable mating end for mating with a mating connector and a wire terminating end configured to receive wires of power cables. The housing has a plurality of terminal chambers. Terminals are received in corresponding terminal chambers. The terminals each have a base, a mating contact extending from the base and a wire contact extending from the base. The mating contact has a mating pad defining a separable mating interface for the terminal for mating with a corresponding mating terminal of the mating connector. The wire contact has plural wire interfaces for mating with plural wires such that plural wires are configured to be terminated to and commoned with each terminal. Wire retention springs are received in the housing each having at least one spring arm defining a wire trap with the corresponding wire contact. The spring arms are releasable to release the wires from the housing.

In a further embodiment, a lighting system is provided including a lamp assembly having plural LED arrays each being powered by a corresponding LED driver having an associated power cable extending therefrom. The lighting system includes a cable connector assembly supplying power to the power cables. The cable connector assembly includes first and second multiple cable disconnects. A plurality of the power cables are terminated to the first multiple cable disconnect. The first multiple cable disconnect includes a housing having a separable mating end for mating with a mating connector and a wire terminating end configured to receive wires of power cables. The housing has a plurality of terminal chambers. Terminals are received in corresponding terminal chambers. The terminals each have a base, a mating contact extending from the base and a wire contact extending from the base. The mating contact has a mating pad defining a separable mating interface for the terminal for mating with a corresponding mating terminal of the mating connector. The wire contact has plural wire interfaces for mating with plural wires such that plural wires are configured to be terminated to and commoned with each terminal. Wire retention springs are received in the housing each having at least one spring arm defining a wire trap with the corresponding wire contact. The spring arms are releasable to release the wires from the housing. The second multiple cable disconnect is identical to the first multiple cable disconnect. The second multiple cable disconnect is coupled to the first multiple cable disconnect. The second multiple cable disconnect is configured to have a power supply cable supply power to terminals of the second multiple cable disconnect to electrically power the terminals of the first multiple cable disconnect at separable interfaces between the terminals of the second multiple cable disconnect and the terminals of the first multiple cable disconnect.

DETAILED DESCRIPTION OF THE INVENTION

Figure 1:
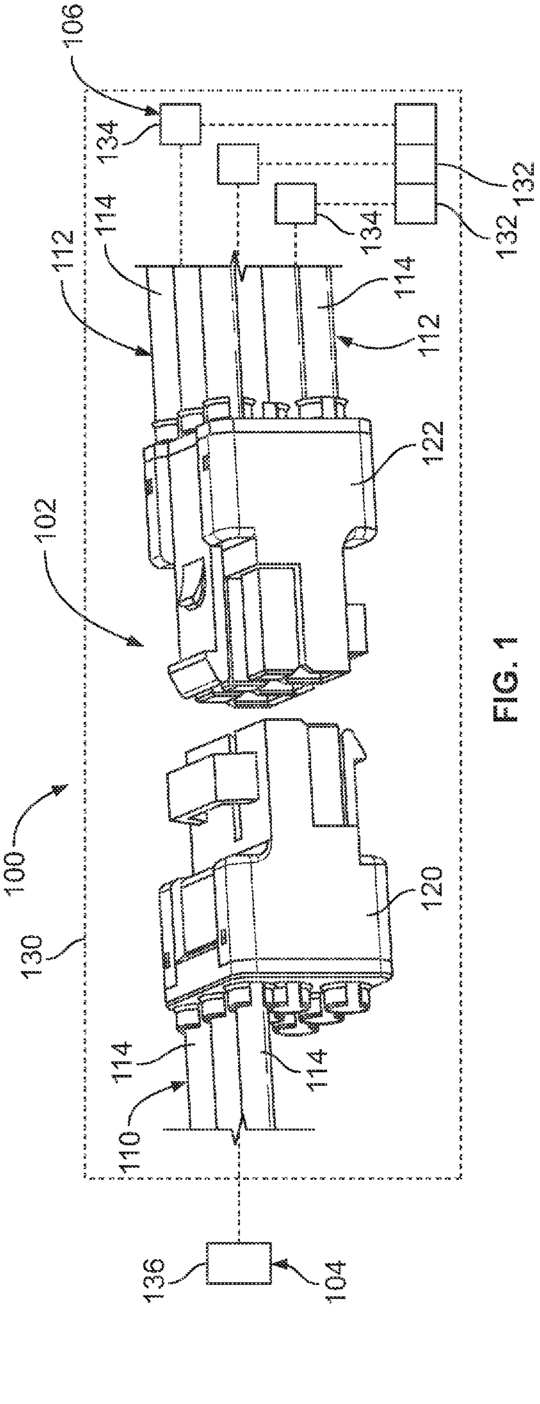
FIG. 1 illustrates an electrical system formed in accordance with an exemplary embodiment.

FIG. 1 illustrates an electrical system 100 formed in accordance with an exemplary embodiment. The electrical system 100 includes a cable connector assembly 102 used to electrically connect one or more electrical components 104, 106. In an exemplary embodiment, the cable connector assembly 102 is used to connect one or more electrical components 104 with one or more electrical components 106 using power cables 110, 112. The cable connector assembly 102 includes multiple cable disconnects 120, 122 to electrically connect the power cables 110 and the power cables 112. In an exemplary embodiment, each power cable 110 includes a plurality of wires 114, such as a hot wire, a neutral wire and a ground wire. The power cables 110, 112 may include any number of wires 114 and are not limited to 3 wire power cables as shown in the illustrated embodiment. In the illustrated embodiment, one power cable 110 is coupled to the multiple cable disconnect 120 while multiple power cables 112 are coupled to the multiple cable disconnect 122. Any number of power cables 110, 112 may be coupled to the multiple cable disconnects 120, 122. The multiple cable disconnects 120, 122 are used to splice and/or common various power cables 110, 112. In an exemplary embodiment, the multiple cable disconnects 120, 122 are identical and hermaphroditic.

The electrical system 100 may be used in various applications. For example, in an exemplary embodiment, the electrical system 100 is a lighting system and may be referred to hereinafter as lighting system 100. The lighting system 100 includes a lamp assembly 130 used as part of a lighting application. For example, the lamp assembly 130 may be a street light fixture or another type of lighting fixture. The electrical system 100 is not limited to a lighting system. For example, the electrical system 100 may be an HVAC unit where AC power enters the unit and may be split by the multiple cable disconnect 120 to run multiple devices of the unit, such as a fan, a control board, a humidifier, and the like. The electrical system may be another device, such as an appliance where AC power enters the appliance (for example, a washing machine) and is then split by the multiple cable disconnect to power other components, such as a motor, a control board, and the like.

The lamp assembly 130 may include one or more lighting devices, such as LED arrays 132. The LED arrays 132 are controlled by LED drivers 134. The LED arrays 132 and LED drivers 134 define various electrical components 106 of the electrical system 100 in the illustrated embodiment. The power cables 112 are electrically connected between the multiple cable disconnect 122 and the LED drivers 134. The LED drivers 134 may include circuit boards or other components. Optionally, the LED arrays 132 and LED drivers 134 may be part of a common circuit board. Alternatively, other cables or wires may extend between the LED drivers 134 and the LED arrays 132.

The lighting system 100 may be powered by a power supply 136. For example, the power cable 110 may be electrically connected between the power supply 136 and the multiple cable disconnect 120. The power supply 136 may be an AC power supply, such as from a circuit breaker. The power supply 136 may define one of the electrical components 104. The multiple cable disconnects 120, 122 may splice the power from the power supply 136 into multiple lines to multiple LED drivers 134.

Other electrical components 104, 106 may be provided in the lighting system 100 in alternative embodiments. Optionally, other power cables 110 may be electrically connected to the multiple cable disconnect 120. For example, other power cables 110 may extend from the multiple cable disconnect 120 to an LED driver or other electrical component. As such, the multiple cable disconnect 120 may operate as a splicer or pigtail connector.

Figure 2:
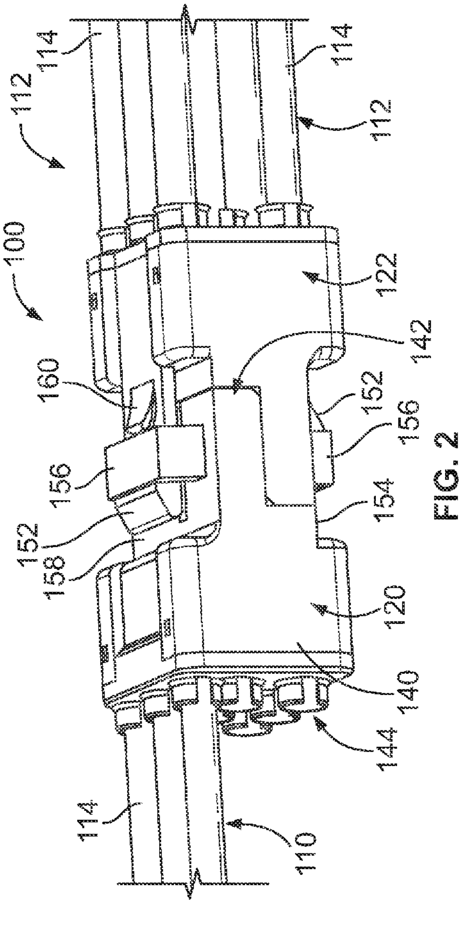
FIG. 2 illustrates the electrical system showing multiple cable disconnects coupled together.
Figure 3:
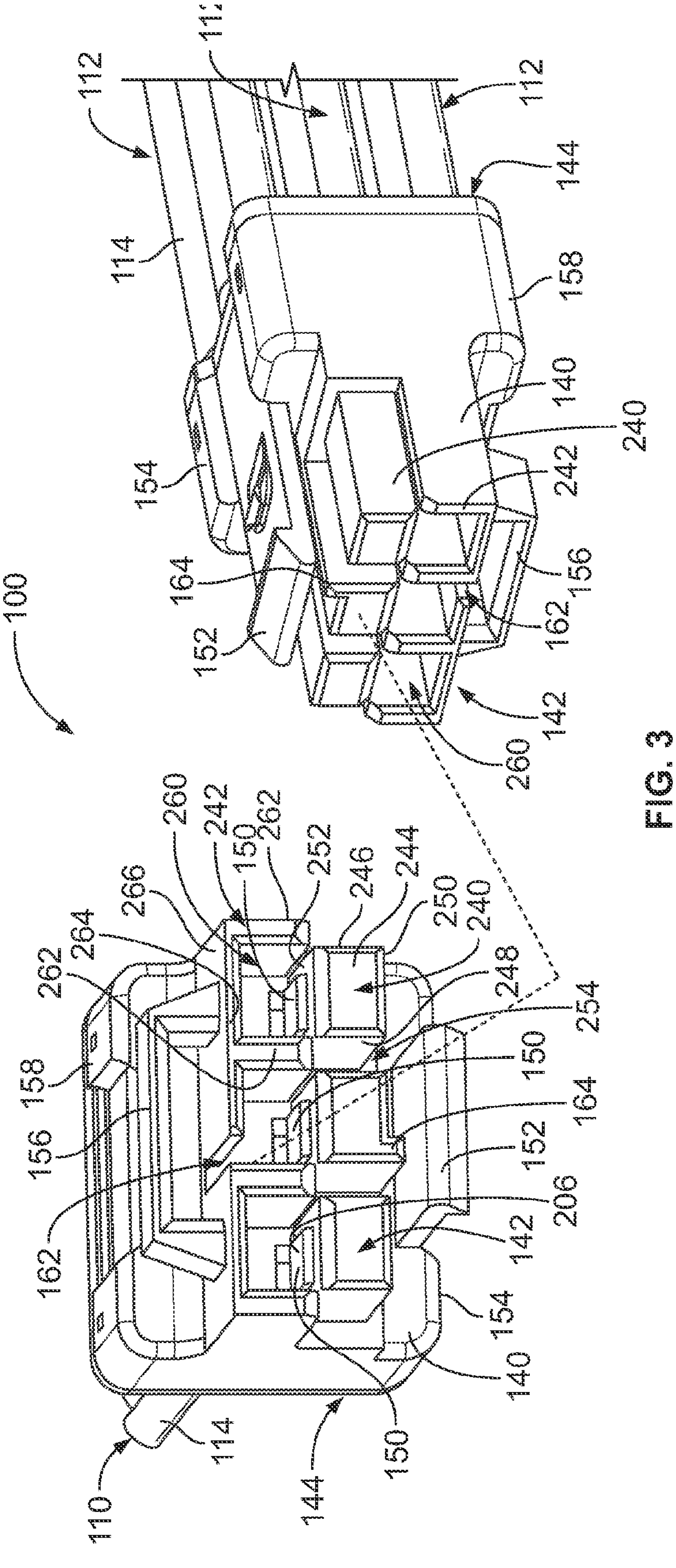
FIG. 3 illustrates the electrical system showing multiple cable disconnects poised for mating.

FIG. 2 illustrates the lighting system 100 showing the multiple cable disconnects 120, 122 coupled together. FIG. 3 illustrates the lighting system 100 showing the multiple cable disconnects 120, 122 poised for mating. The multiple cable disconnects 120, 122 are coupled together to electrical connect the power cables 110, 112 and thus the electrical components 104, 106 (shown in FIG. 1).

In an exemplary embodiment, the multiple cable disconnects 120, 122 are hermaphroditic and oriented 180 degrees relative to each other for coupling thereto. In the description below, components or features may be described with respect to the multiple cable disconnect 120 or the multiple cable disconnect 122, however such components or features may be applicable to the other multiple cable disconnect 120, 122.

The multiple cable disconnect 120 includes a housing 140 having a separable mating end 142 for mating with a mating connector, such as the multiple cable disconnect 122. The housing 140 has a wire terminating end 144 configured to receive the wires 114 of the one or more power cables 110. Terminals 150 (FIG. 3) are received in and held by the housing 140. The wires 114 of the power cables 110 are configured to be electrically connected to the terminals 150, such as at the wire terminating end 144. The terminals 150 are configured to be electrically connected to mating terminals 150 of the multiple cable disconnect 122.

In an exemplary embodiment, the multiple cable disconnect 120 includes a latch 152 extending from a first end 154 of the housing 140 at or near the separable mating end 142. The housing 140 includes a catch 156 extending from a second end 158 opposite the first end 154 at or near the separable mating end 142. In the illustrated embodiment, the first end 154 defines a bottom end of the multiple cable disconnect 120 and the second end 158 defines a top end of the multiple cable disconnect 120, while the first end 154 defines a top end of the second multiple cable disconnect 122 and the second end 158 defines a bottom end of the second multiple cable disconnect 122. Optionally, the latch 152 may include a latch release 160 for releasing the latch 152 from the catch 156 of the multiple cable disconnect 122. The latch 152 is deflectable to release and uncouple the multiple cable disconnects 120, 122. The latch 152 may have a ramped lead-in surface to guide mating of the latch 152 with the catch 156 of the other multiple cable disconnect 122.

Optionally, the multiple cable disconnect 120 may have keying features 162, 164 for keyed mating of the multiple cable disconnect 120 with the multiple cable disconnect 122. For example, in the illustrated embodiment, the keying feature 162 is a slot and the keying feature 164 is a tab or protrusion configured to be received in the keying feature 162. Other types of keying features may be provided in alternative embodiments. Other multiple cable disconnects may have keying features in other locations for keyed mating with the corresponding multiple cable disconnect.

Figure 4:
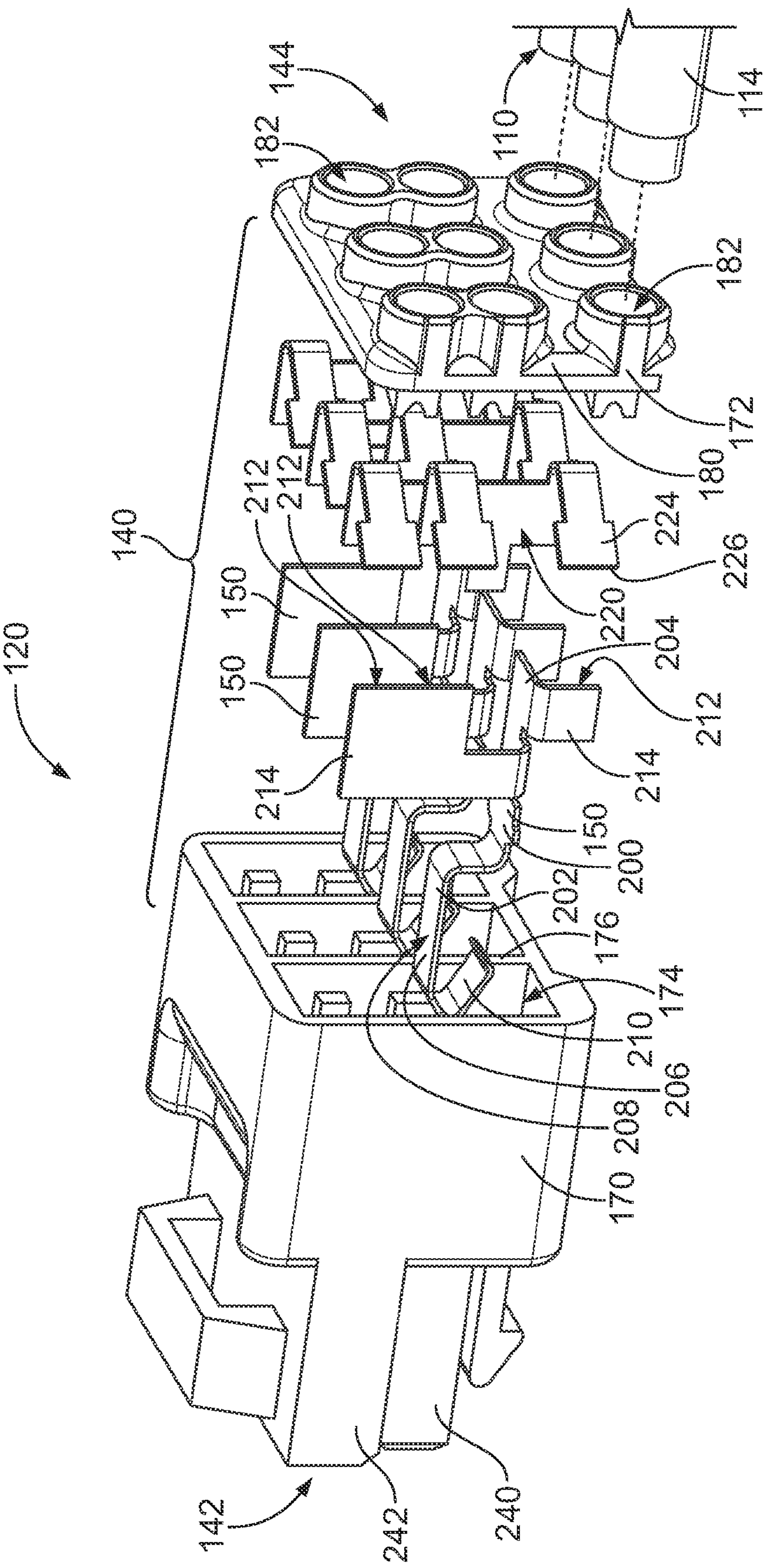
FIG. 4 is an exploded view of one of the multiple cable disconnects in accordance with an exemplary embodiment.

FIG. 4 is an exploded view of the multiple cable disconnect 120 in accordance with an exemplary embodiment. The multiple cable disconnect 120 includes the housing 140 holding the terminals 150. In an exemplary embodiment, the housing 140 is a multi-piece housing including a front housing 170 at the separable mating end 142 and a wire holder 172 at the wire terminating end 144. The front housing 170 and the wire holder 172 are separate components configured to be coupled together. Optionally, the front housing 170 and wire holder 172 may be dielectric components, such as plastic components, which may be molded, such as by injection molding.

The front housing 170 has a plurality of terminal chambers 174 that receive corresponding terminals 150. The terminal chambers 174 may be open at the rear end of the front housing 170 and the terminals 150 may be loaded into the terminal chambers 174 through the open rear end. Separating walls 176 separate the terminal chambers 174. The separating walls 176 may electrically isolate the terminals 150 from each other. The separating walls 176 may define a mounting structure for the terminals 150 to mount and secure the terminals 150 in the front housing 170.

The wire holder 172 includes a base 180 that may be coupled to the front housing 170. The wire holder 172 includes a plurality of wire bores 182 extending therethough. The wire bores 182 are configured to receive corresponding wires 114 and may guide the wires 114 into electrical connection with the corresponding terminals 150 when the wires 114 are poked in to the wire bores 182.

The terminals 150 each have a base 200, a mating contact 202 extending from the base 200 and a wire contact 204 extending from the base 200 opposite the mating contact 202. In the illustrated embodiment, the mating contact 202 is oriented generally horizontally extending forward of the base 200. The mating contact 202 has a mating pad 206 defining a separable mating interface 208 for the terminal 150 for mating with the corresponding mating terminal 150 of the multiple cable disconnect 122 (shown in FIG. 3). The mating contact 202 includes a spring arm 210 for supporting and spring biasing the mating pad 206 against the mating terminal 150 of the second multiple cable disconnect 122 when mated thereto. The spring arm 210 may be provided at a distal end of the mating contact 202. Optionally, the mating pad 206 may be generally planar. Alternatively, the mating pad 206 may be curved or arched.

The wire contact 204 has plural wire interfaces 212 for mating with plural wires 114 of different power cables 110, 112 such that plural wires 114 are configured to be terminated to and commoned with each terminal 150. Optionally, the wire contact 204 may include one or more tabs 214, each defining one or more wire interfaces 212. Optionally, the tabs 214 may be bent in different directions. In the illustrated embodiment, the tabs 214 of the wire contacts 204 are oriented vertically and are configured to be loaded into corresponding terminal chambers 174 for mating with the wires 114. As such, the wire contacts 204 of the terminals 150 are arranged vertically and are stacked within the housing 140. Each terminal 150 is configured to be electrically connected to a different wire 114 of each of the power cables 110 (or 112) poked in to the wire terminating end 144 of the housing 140. The wire interfaces 212 are arranged at different vertical heights along the wire contact 204 for electrical connection to different wires 114 of different power cables 110 (or 112). For example, the wire interfaces 212 may be aligned with corresponding wire bores 182 at different vertical heights along the wire contact 204.

In an exemplary embodiment, the multiple cable disconnect 120 includes wire retention springs 220 configured to be received in the front housing 170. The wire retention spring 220 are used in association with corresponding terminals 150. The wire retention springs 220 and the terminals 150 define wire traps for trapping corresponding wires 114 in the multiple cable disconnect 120. For example, the wires 114 may be poked in to corresponding wire bores 182 and pinched or sandwiched between the wire retention spring 220 and the corresponding terminal 150 to create an electrical connection between the wire 114 and the terminal 150.

In the illustrated embodiment, the wire retention spring 220 is a separate component from the terminal 150 and includes a base 222 and one or more spring arms 224. Alternatively, the wire retention spring 220 may be integral with the terminal 150, such as being stamped and formed from the terminal 150. In the illustrated embodiment, each wire retention spring 220 includes a plurality of spring arms 224, with each spring arm 224 being associated with a corresponding wire bore 182 and configured to receive a different wire 114. Alternatively, multiple wire retention springs may be provided and associated with each terminal 150, where each wire retention spring includes a single spring arm. Having the wire retentions springs 220 separate from the terminal 150 allows the wire retention spring 220 to be manufactured from a different type of material as compared to the terminal 150. For example, the terminal 150 may be manufactured from a material having characteristics of good electrical conductivity, such as copper, whereas the wire retention spring 220 may be manufactured from a material having a characteristic of good mechanical integrity or spring force, such as stainless steel. The spring arms 224 include edges 226 that are used to pinch the wire 114 and hold the wire 114 in the multiple cable disconnect 120. A wire trap may be defined between the edge 226 of the spring arm 224 and the wire interface 212 of the wire contact 204.

With additional reference back to FIG. 3, the housing 140, at the separable mating end 142, includes plural contact holders 240 and plural hoods 242 associated with corresponding contacts holders 240. The contact holders 240 and the hoods 242 define a hermaphroditic mating interface of the multiple cable disconnect 120. The hoods 242 cover the contact holders 240. The contact holders 240 hold mating contacts 202 of corresponding terminals 150 such that the mating pads 206 are exposed along a portion of the contact holder 240 for mating with the mating terminals 150 of the second multiple cable disconnect 122.

The contact holders 240 each have a front end 244, sides 246, 248 extending rearward from the front end 244, an outer end 250 extending rearward from the front end 244 between the sides 246, 248 and an inner end 252 opposite the outer end 250. The inner end 252 faces the corresponding hood 242. The inner end 252 may have an opening and the mating pad 206 may be exposed within the opening at the inner end 252. Gaps 254 are provided between adjacent contact holders 240. The sides 246, 248 face each other across the gaps 254.

The hoods 242 have a plurality of walls defining pockets 260. The pockets 260 are sized, shaped, and positioned to receive the contact holders 240 of the second multiple cable disconnect 122 when the multiple cable disconnects 120, 122 are coupled together. For example, the pockets 260 may have a volume slightly larger than a volume of the contact holders 240 (e.g. height, length, width). The pocket 260 is defined by side walls 262 extending rearward from a front end 264 of the hood 242. The hood 242 has an outer end 266 extending between the side walls 262 opposite the contact holder 240. The hood 242 is open along the inner end to expose the mating contact 202. In an exemplary embodiment, the side walls 262 are aligned with the gaps 254 and the contact holder 240 are aligned with the pockets 260. For example, in the illustrated embodiment, the contact holders 240 are positioned below the pockets 260 of the corresponding hoods 242.

The second multiple cable disconnect 122 is inverted 180 degrees such that the contact holders 240 of the second multiple cable disconnect 122 are positioned above the hoods 242 and corresponding pockets 260. When the second multiple cable disconnect 122 is coupled to the first multiple cable disconnect 120, the pockets 260 of the hoods 242 receive corresponding contact holders 240 and the mating contacts 202 of the terminals 150 are electrically connected together.

The multiple cable disconnects 120, 122 have a hermaphroditic mating interface defined by the contact holders 240 and the hoods 242. Optionally, the contact holders 240 and the hoods 242 at the front ends 244, 264 may be chamfered or have lead-in surfaces for guiding mating of the multiple cable disconnects 120, 122. The keying features 162, 164 are provided on the hoods 242 and contact holder 240 respectively.

Figure 5:
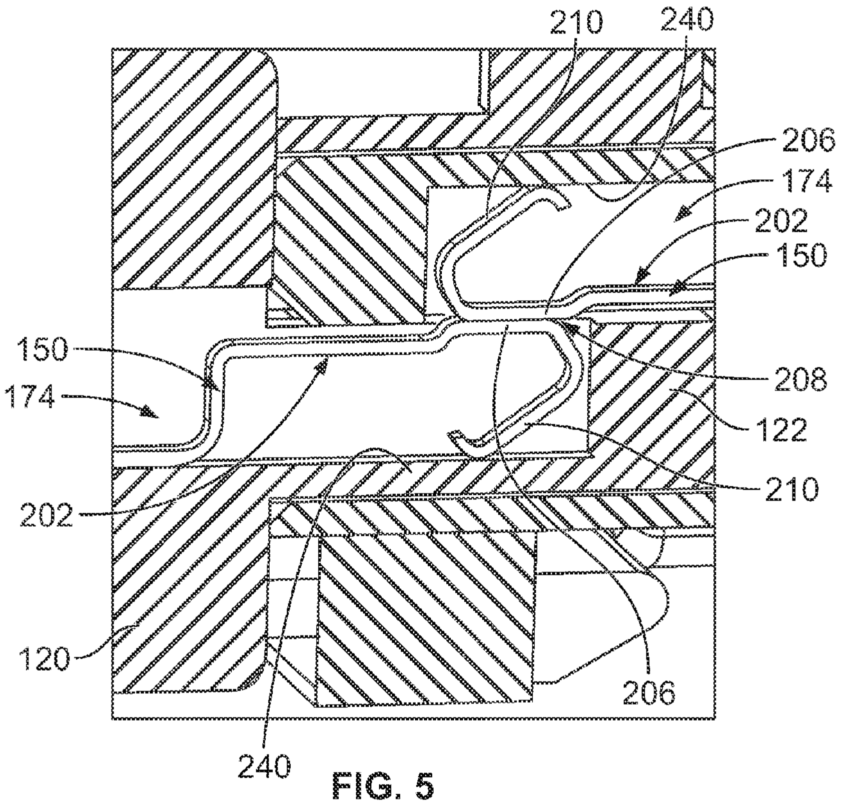
FIG. 5 is cross-sectional view of a portion of a cable connector assembly of the electrical system showing multiple cable disconnects coupled together.

FIG. 5 is cross-sectional view of a portion of the cable connector assembly 102 showing the multiple cable disconnects 120, 122 coupled together. The terminals 150 are received in corresponding terminal chambers 174. The terminal chambers 174 extend at least partially through the contact holders 240 and the mating contacts 202 are exposed at front ends of the terminal chambers 174. The front ends 244 of the contact holders 240 are positioned forward of the mating contacts 202.

The spring arms 210 of the mating contacts 202 engage the contact holders 240 to spring bias the mating pads 206 outward toward each other to spring bias the terminals 150 of the multiple cable disconnects 120, 122 into electrical engagement with each other. Optionally, the spring arms 210 may be at least partially compressed or deflected when mated to ensure that the mating pads 206 are spring biased against each other.

Figure 6:
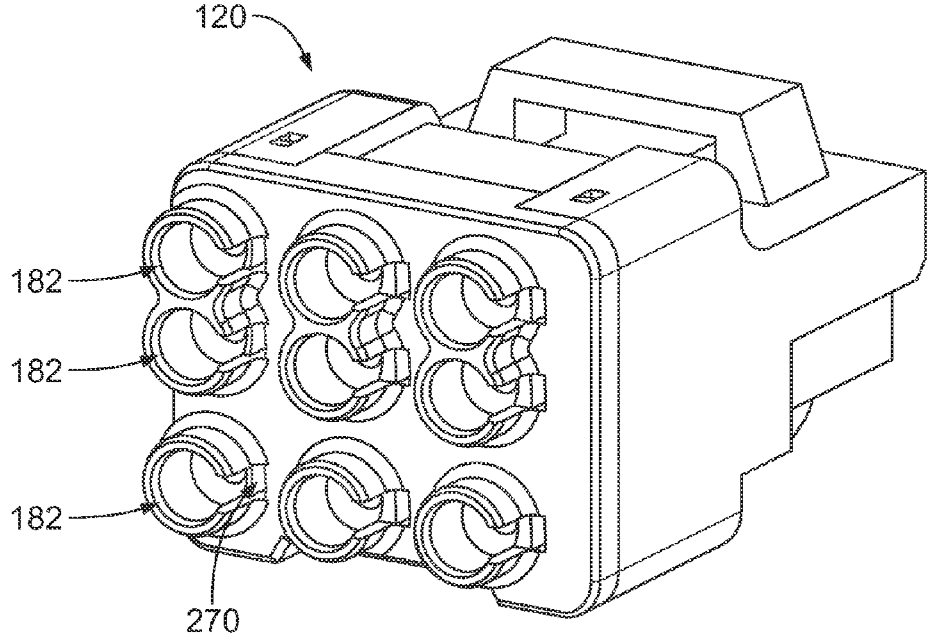
FIG. 6 is a rear perspective view of the multiple cable disconnect in an assembled stated.

FIG. 6 is a rear perspective view of the multiple cable disconnect 120 in an assembled stated. The wire holder 172 is coupled to the front housing 170 and the wire bores 182 are configured to receive corresponding wires 114 (shown in FIG. 2). In the illustrated embodiment, the wire bores 182 are arranged in rows and columns. Each row of wire bores 182 is configured to receive the wires 114 of a corresponding power cable 110 (or 112). Optionally, the wire bores 182 may be color coded to indicate which wire 114 is supposed to be plugged into which wire bore 182. For example, the left wire bore 182 of each row may be configured to receive a neutral wire, the middle wire bore 182 of each row may be configured to receive a ground wire and the right wire bore 182 of each row may be configured to receive a hot or power wire. The wire bores 182 in each column are all configured to receive the same type of wire, such that the same types of wires are each commoned to the same terminal 150. For example, all of the grounding wires are all commoned to the same terminal, all neutral wires are all commoned to the same terminal and all hot wires are commoned to the same terminal. Any number of rows of wire bores 182 may be provided depending on the number of power cables that the multiple cable disconnect 120 is used to electrically common. In the illustrated embodiment, the multiple cable disconnect 120 is used to common up to three power cables.

In an exemplary embodiment, the wires 114 are releasable from the multiple cable disconnect 120, such as to rework or rewire the multiple cable disconnect 120. In an exemplary embodiment, the wire holder 172 includes wire release slots 270 that may receive a tool to release the wires 114 from the wire bores 182 and the wire traps inside the multiple cable disconnect 120. Optionally, each wire 114 may be individually released, and as such, some of the wires 114 may be unreleased while other wires 114 are released for rework or rewiring.

Figure 7:
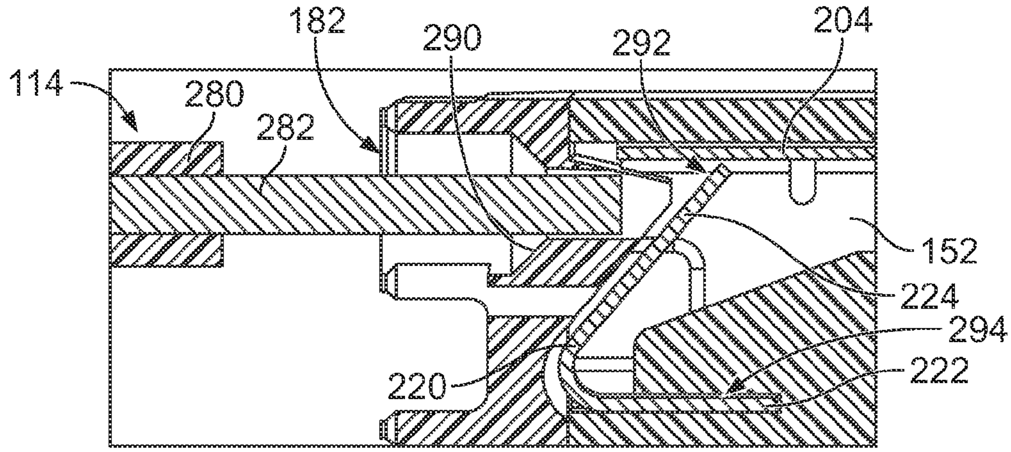
FIG. 7 is a partial cross-sectional view of a portion of the multiple cable disconnect showing a wire being poked in to the multiple cable disconnect.
Figure 8:
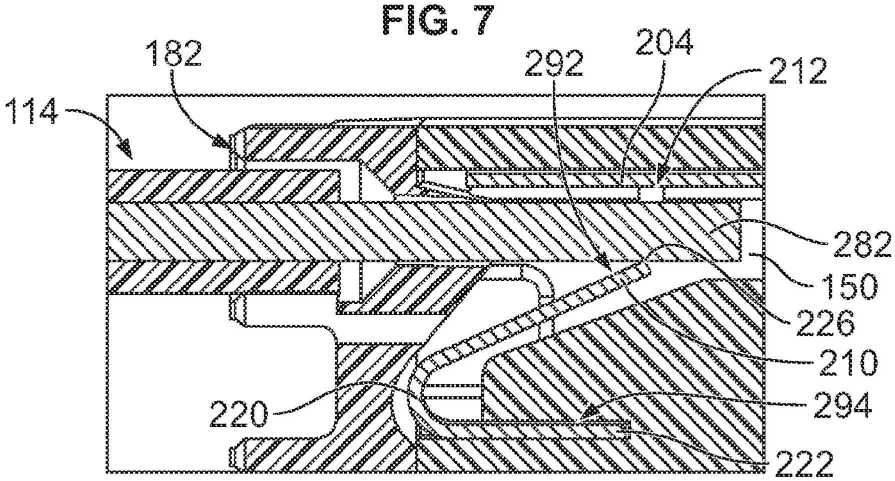
FIG. 8 is a partial cross-sectional view of a portion of the multiple cable disconnect showing the wire terminated to the multiple cable disconnect.
Figure 9:
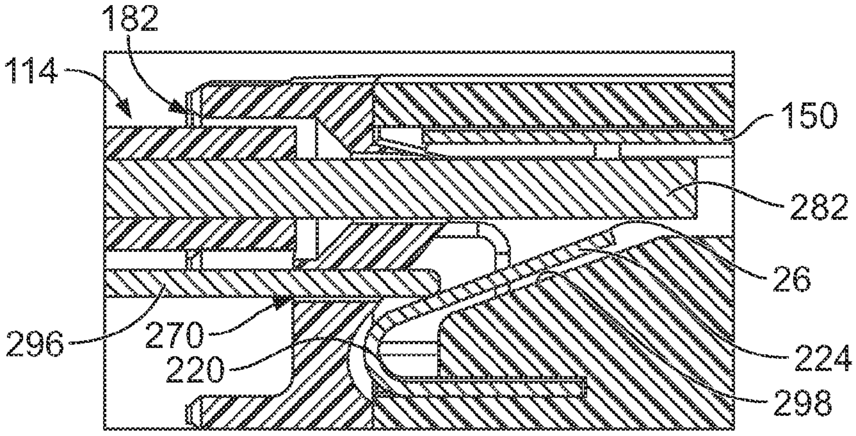
FIG. 9 is a partial cross-sectional view of a portion of the multiple cable disconnect showing the wire being released from the multiple cable disconnect.

FIG. 7-9 are partial cross-sectional views of a portion of the multiple cable disconnect 120. FIG. 7 illustrates the wires 114 being poked into the multiple cable disconnect 120. FIG. 8 illustrates the wire 114 terminated to the multiple cable disconnect 120. FIG. 9 illustrates the wire 114 being released from the multiple cable disconnect 120.

The wire 114 is prepared for connection to the multiple cable disconnect 120 by stripping the end of the wire and removing a portion of a jacket 280 of the wire 114 to expose a conductor 282 of the wire 114. The conductor 282 may be a solid conductor or may be a stranded conductor. The wire bore 182 is sized to receive the conductor 282 and may be sized to receive the jacket 280. The wire bore 182 may include a wire guide 290 for guiding the wire 114 into the multiple cable disconnect 120.

The wire 114 is loaded into the wire bore 182 (FIG. 7) such that the conductor 282 is poked into a wire trap 292 defined between the wire retention spring 220 and the wire contact 204. The wire retention spring 220 is held in the front housing 170, such as in a slot 294 and the spring arm 224 extends toward the wire interface 212 of the wire contact 204. When the wire 114 is poked into the wire trap 292, (FIG. 8) the spring arm 210 may be at least partially deflected away from the wire contact 204. The edge 226 of the spring arm 224 engages and presses against the conductor 282 to hold the wire 114 in the multiple cable disconnect 120. The conductor 282 is forced against the wire interface 212 of the wire contact 204 by the spring arm 210 to create an electrical connection between the conductor 282 and the terminal 150.

The wire 114 may be released (FIG. 9) from the multiple cable disconnect 120 by releasing the spring arm 210 from the conductor 282. A tool 296 is used to release the spring arm 210. The tool 296 is loaded through the wire release slot 270 and engages the spring arm 210 to force the spring arm 210 away from the conductor 282. In an exemplary embodiment, the front housing 170 includes an overstress feature 298 adjacent the spring arm 210 to limit release of the spring arm 210 and thus prevent overstress of the spring arm 210 (e.g. plastic deformation). After the wire 114 is removed from the multiple cable disconnect 120, the spring arm 210 may be released and returned to the normal position (shown in FIG. 7).

Figure 10:
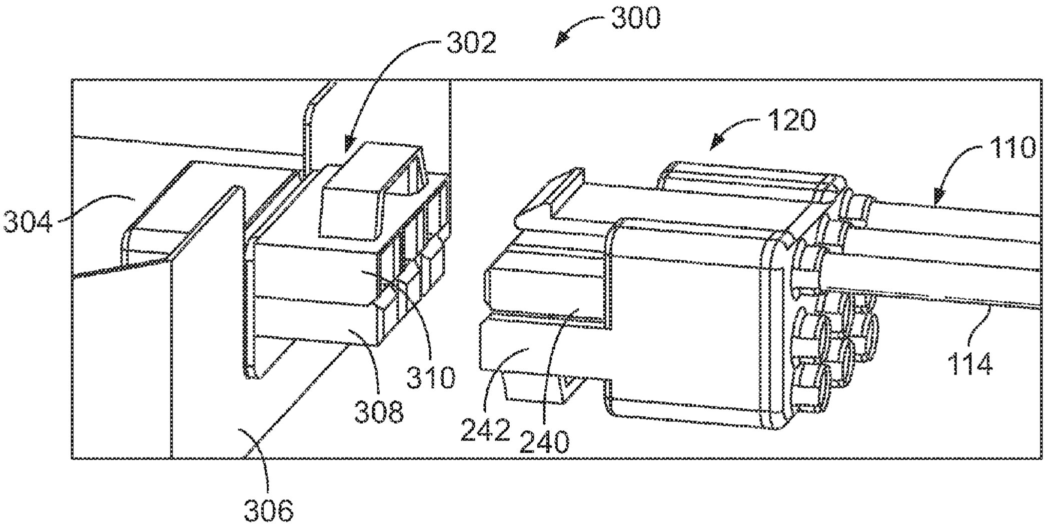
FIG. 10 illustrates an electrical system formed in accordance with an exemplary embodiment showing components thereof poised for mating.
Figure 11:
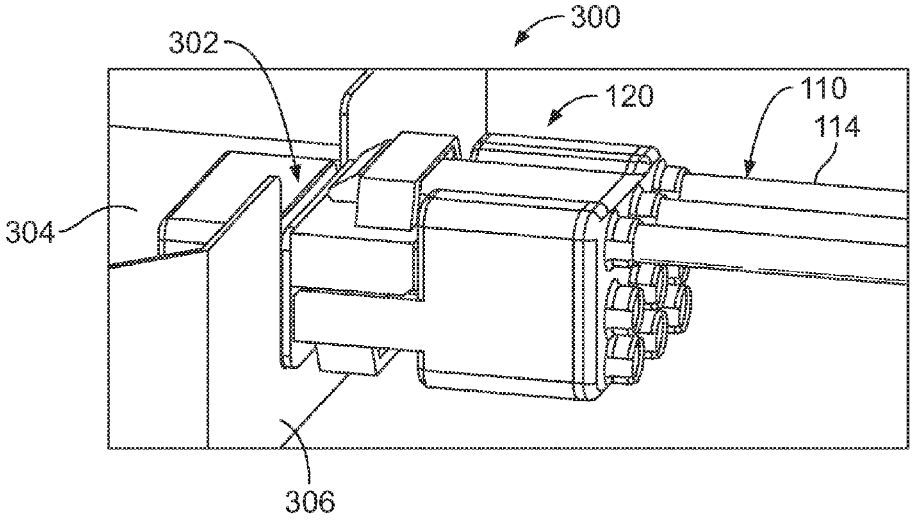
FIG. 11 illustrates the electrical system shown in FIG. 10 showing the components mated.

FIG. 10 illustrates an electrical system 300 formed in accordance with an exemplary embodiment showing the components thereof poised for mating. FIG. 11 illustrates the electrical system 300 showing the components mated. The electrical system 300 includes an electrical connector 302 mounted to a circuit board 304 within a chassis 306. The circuit board 304 may be an LED driver or another electrical component. The multiple cable disconnect 120 is configured to be electrically connected to the electrical connector 302. The electrical connector 302 includes a mating interface similar to the multiple cable disconnect 122, including contact holders 308 and hoods 310. The electrical connector 302 includes terminals (not shown) configured to be electrically connected to the circuit board 304, such as by soldering, through-hole mounting, or by other processes. Power may be supplied to the electrical connector 302 by the power cable 110. Other power cables may extend from the multiple cable disconnect 120 to other components, such as other LED drivers. In other embodiments, power may be supplied to the multiple cable disconnect 120 from the circuit board through the electrical connector 302.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A multiple cable disconnect comprising:

a housing having a separable mating end for mating with a mating connector and a wire terminating end configured to receive wires of power cables, the housing having a plurality of terminal chambers;

terminals received in corresponding terminal chambers, the terminals each having a base, a mating contact extending from the base and a wire contact extending from the base, the mating contact having a mating pad defining a separable mating interface for the terminal for mating with a corresponding mating terminal of the mating connector, the wire contact having plural wire interfaces for mating with plural wires such that plural wires are configured to be terminated to and commoned with each terminal; and wire retention springs received in the housing, each wire retention spring having at least one spring arm defining a wire trap with the corresponding wire contact, the spring arms being releasable to release the wires from the housing.

2. The multiple cable disconnect of claim 1, wherein the terminals take power in and split the power to multiple power cables.

3. The multiple cable disconnect of claim 1, wherein the separable mating end of the housing is hermaphroditic and configured to mate with an identical second housing of a second multiple cable disconnect defining the mating connector.

4. The multiple cable disconnect of claim 1, wherein the wire terminating end includes a plurality of wire bores configured to receive corresponding wires, the wire traps being aligned with corresponding wire bores to accept the wires.

5. The multiple cable disconnect of claim 4, further comprising wire release slots associated with corresponding wire bores to release the wires from the wire traps.

6. The multiple cable disconnect of claim 1, wherein the housing comprises a front housing at the separable mating end and a wire holder at the wire terminating end, the wire holder being coupled to the front housing, the front housing holding the terminals, the wire holder having wire bores guiding the wires into electrical connection with the wire contacts when the wires are poked in to the wire bores.

7. The multiple cable disconnect of claim 1, wherein the terminals are arranged vertically and stacked within the housing, each terminal being electrically connected to a different wire of each power cable poked in to the wire terminating end of the housing, the wire interfaces being arranged at different vertical heights along the wire contact for electrical connection to different wires of different power cables.

8. The multiple cable disconnect of claim 1, wherein each terminal is configured to electrically common wires from at least three different power cables.

9. The multiple cable disconnect of claim 1, wherein the spring arms of the wire retention springs are deflectable toward and away from the corresponding wire contacts, the spring arms each having an edge configured to capture the wires at the corresponding wire interfaces.

10. The multiple cable disconnect of claim 1, wherein the housing, at the separable mating end, includes plural contact holders and plural hoods associated with corresponding contact holders and covering such contact holders, the contact holders holding mating contacts of corresponding terminals, the mating pads of the mating contacts being exposed along the contact holders for mating with the mating terminals of the mating connector.

11. The multiple cable disconnect of claim 10, wherein the contact holders are separated by gaps, the hoods having side walls surrounding a pocket, the side walls being aligned with the gaps, the pockets being aligned with the contact holders.

12. The multiple cable disconnect of claim 11, wherein the pockets have a volume slightly larger than a volume of the contact holders.

13. The multiple cable disconnect of claim 1, wherein the housing includes a latch extending from a first end at or near the separable mating end and the housing includes a catch extending from a second end opposite the first end at or near the separable mating end.

14. The multiple cable disconnect of claim 1, wherein the separable mating end of the housing includes hermaphroditic keying features.

15. The multiple cable disconnect of claim 1, wherein each wire retention spring includes a plurality of spring arms corresponding to the plural wire interfaces.

16. The multiple cable disconnect of claim 1, wherein the wire retentions springs are integral with the corresponding terminals.

17. The multiple cable disconnect of claim 1, wherein the housing includes overstress features adjacent the spring arms to limit release of the spring arms.

18. A cable connector assembly comprising:

first and second multiple cable disconnects electrically connected together, the first and second multiple cable disconnects being identical and hermaphroditic, the first and second multiple cable disconnects being inverted 180° relative to each other when coupled together, each of the first and second multiple cable disconnects comprising:

a housing having a separable mating end and a wire terminating end configured to receive wires of power cables, the housing having a plurality of terminal chambers;

terminals received in corresponding terminal chambers, the terminals each having a base, a mating contact extending from the base and a wire contact extending from the base, the mating contact having a mating pad defining a separable mating interface for the terminal for mating, the wire contact having plural wire interfaces for mating with plural wires such that plural wires are configured to be terminated to and commoned with each terminal; and wire retention springs received in the housing, each wire retention spring having at least one spring arm defining a wire trap with the corresponding wire contact, the spring arms being releasable to release the wires from the housing.

19. The cable connector assembly of claim 18, wherein the housing, at the separable mating end, includes plural contact holders and plural hoods associated with corresponding contact holders and covering such contact holders, the contact holders holding mating contacts of corresponding terminals, the mating pads of the mating contacts being exposed along the contact holders for mating with the mating terminals of the mating connector, the contact holders being separated by gaps, the hoods having side walls surrounding a pocket, the side walls being aligned with the gaps, the pockets being aligned with the contact holders;

wherein the contact holders of the first multiple cable disconnect are received in pockets of the hoods of the second multiple cable disconnect; and wherein the contact holders of the second multiple cable disconnect are received in pockets of the hoods of the first multiple cable disconnect.

20. A lighting system comprising:

a lamp assembly having plural LED arrays, each LED array being powered by a corresponding LED driver, each LED driver having an associated power cable extending therefrom;

a cable connector assembly supplying power to the power cables, the cable connector assembly comprising a first multiple cable disconnect, wherein a plurality of the power cables are terminated to the first multiple cable disconnect, the first multiple cable disconnect comprising:

a housing having a separable mating end and a wire terminating end configured to receive wires of the plurality of power cables, the housing having a plurality of terminal chambers;

terminals received in corresponding terminal chambers, the terminals each having a base, a mating contact extending from the base and a wire contact extending from the base, the mating contact having a mating pad defining a separable mating interface for the terminal for mating, the wire contact having plural wire interfaces for mating with corresponding wires of different power cables to electrically common corresponding wires of the different power cables with the corresponding terminals; and wire retention springs received in the housing, each wire retention spring having at least one spring arm defining a wire trap with the corresponding wire contact, the spring arms being releasable to release the wires from the housing;

wherein the cable connector assembly comprises a second multiple cable disconnect identical to the first multiple cable disconnect, the second multiple cable disconnect being coupled to the first multiple cable disconnect, the second multiple cable disconnect being configured to have a power supply cable supply power to terminals of the second multiple cable disconnect to electrically power the terminals of the first multiple cable disconnect at separable interfaces between the terminals of the second multiple cable disconnect and the terminals of the first multiple cable disconnect.

* * * * *